United States Patent [19]
Wang

[11] Patent Number: 5,346,237
[45] Date of Patent: Sep. 13, 1994

[54] BICYCLE FRAME CONSISTED OF CARBON FIBER FRAME TUBES AND METAL CONNECTORS

[76] Inventor: Tsai-Te Wang, No. 139, Kuo Sheng St., Yung Kang Hsiang, Tainan Hsien, Taiwan

[21] Appl. No.: 91,012

[22] Filed: Jul. 14, 1993

[51] Int. Cl.⁵ .............................................. B62K 19/18
[52] U.S. Cl. .............................. 280/281.1; 280/288.3; 403/269
[58] Field of Search ............... 280/281.1, 288.3, 288.4, 280/304.3; 403/269, 261, 266, 231, 179, 404

[56] References Cited

U.S. PATENT DOCUMENTS

| | | | |
|---|---|---|---|
| 5,018,900 | 5/1991 | Darrin | 280/281.1 X |
| 5,052,848 | 10/1991 | Nakamura | 280/281.1 X |
| 5,100,162 | 3/1992 | Lo | 280/281.1 |
| 5,129,666 | 7/1992 | Lai | 280/281.1 |

FOREIGN PATENT DOCUMENTS

| | | | |
|---|---|---|---|
| 0635271 | 9/1936 | Fed. Rep. of Germany | 280/281.1 |
| 0617311 | 2/1927 | France | 280/281.1 |
| 0938093 | 9/1948 | France | 280/281.1 |
| 2600031 | 12/1987 | France | 280/281.1 |
| 0220989 | 9/1990 | Japan | 280/281.1 |
| 0013614 | 8/1889 | United Kingdom | 280/281.1 |
| 0304896 | 1/1929 | United Kingdom | 403/269 |

*Primary Examiner*—Margaret A. Focarino
*Assistant Examiner*—Florian Zeender
*Attorney, Agent, or Firm*—Jacobson, Price, Holman & Stern

[57] ABSTRACT

A bicycle frame is made of frame tubes interconnected together by metal connectors at opposite ends of the frame tubes. The frame tubes each consist of a carbon fiber tube and metal connecting members at opposite ends of the carbon fiber tube. The metal connecting members are threaded onto sockets on the connectors. The carbon fiber tubes and the metal connecting members are interengaged by annular grooves on the connecting members and interfitting annular flanges on the carbon fiber tubes. The connecting members may be welded to the connectors through end notches in the connecting members.

5 Claims, 4 Drawing Sheets

BICYCLE FRAME CONSISTED OF CARBON FIBER FRAME TUBES AND METAL CONNECTORS

BACKGROUND OF THE INVENTION

The present invention relates to a bicycle frame which is made of carbon fiber frame tubes connected into shape by metal connectors.

The frame of a conventional bicycle is generally made by welding metal tubes into shape. This structure of such a bicycle is quite heavy and not suitable for racing. Because the frame is made through a complicated manufacturing process including procedures of welding, grinding, and washing, the production efficiency is low, and the manufacturing cost is high.

SUMMARY OF THE INVENTION

The present invention has been accomplished under the aforesaid circumstances. Therefore the principal object of the present invention to provide a bicycle frame which is lightweight and suitable for racing. Another object of the present invention is to provide a bicycle frame which is made of carbon fiber tubes and metal connectors that can be easily fastened together without through the complicated welding process. Another object of the present invention is to provide a bicycle frame which has a nice look.

Because carbon fiber filaments can not be used for making a tube through an injection molding process, they must be used with a liquid adhesive agent for making a tube by heating. Further, a carbon fiber tube can not be processed with a thread. In order to eliminate this problem, the present inventor provides a technique to fasten threaded metal connecting members to carbon fiber tubes so that the carbon fiber tubes can be used for making a lightweight bicycle frame.

The bicycle frame of the preferred embodiment of the present invention is comprised of two-way and four-way connectors, and frame tubes. The connectors are respectively made from a suitable metal, each having at least one male thread (or female thread). The frame tubes are respectively made from carbon fibers, each comprised of a carbon fiber tube and two metal connecting members respectively fastened to the carbon fiber tube at two opposite ends. The carbon fiber tube is made from a carbon fiber cloth through a heating process, having two opposite inside flanges respectively engaged around a respective annular outside groove on either metal connecting member. The two metal connecting members of each Frame tube include one having a left-handed female thread (or left-handed male thread), and the other having a right-handed female thread (or right-handed male thread). Each metal connecting member has end notches, through which a water surface welding process is employed to fasten the respective metal connecting member to the respective connector. Alternatively, radial screw holes may be made on the metal connecting member so that the metal connecting member can be fastened to the respective two-way or four-way connector by screws, rivets, etc.

DETAILED DESCRIPTION OF THE PREFERRED EMBODIMENT

Figure 1:
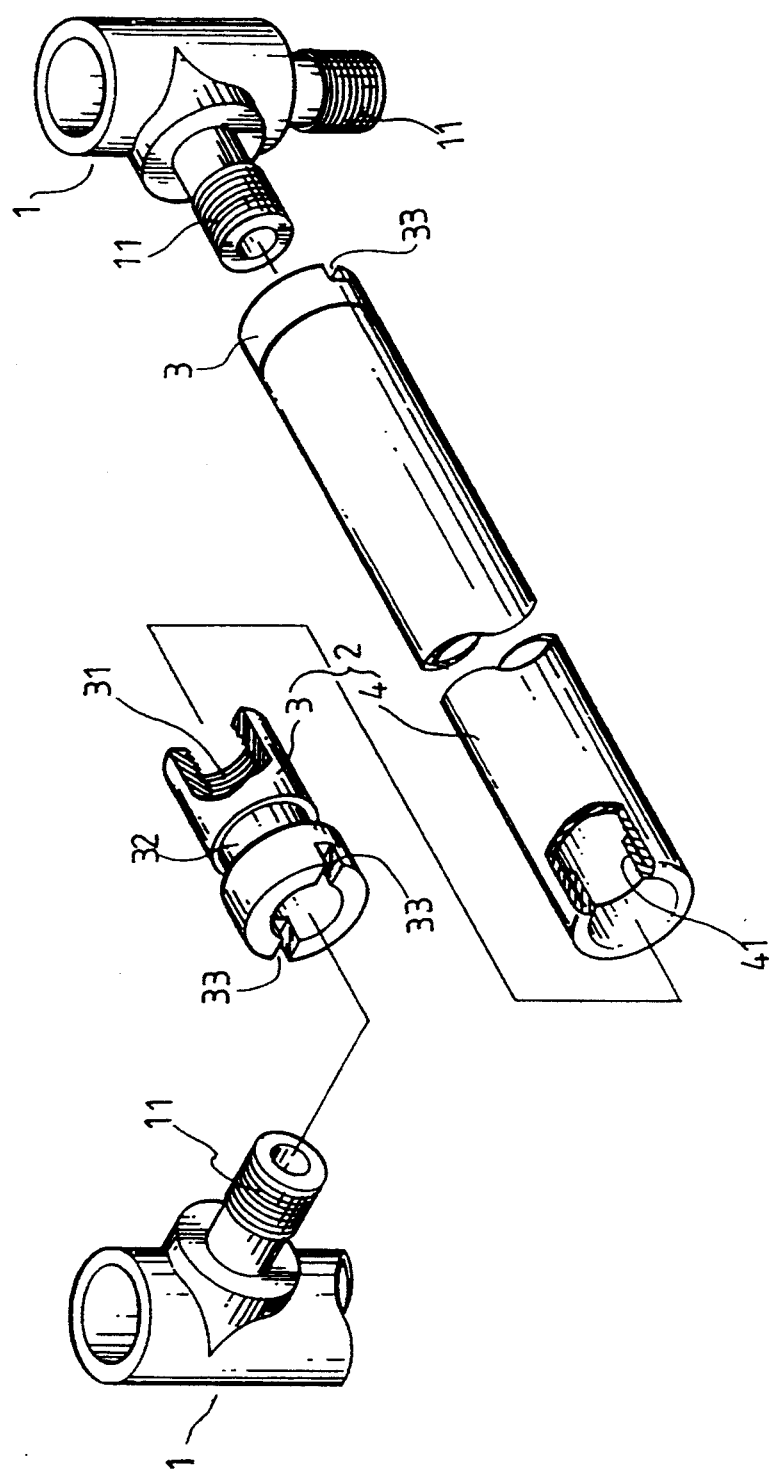
FIG. 1 is a partial exploded view of a preferred embodiment of the present invention.
Figure 2:
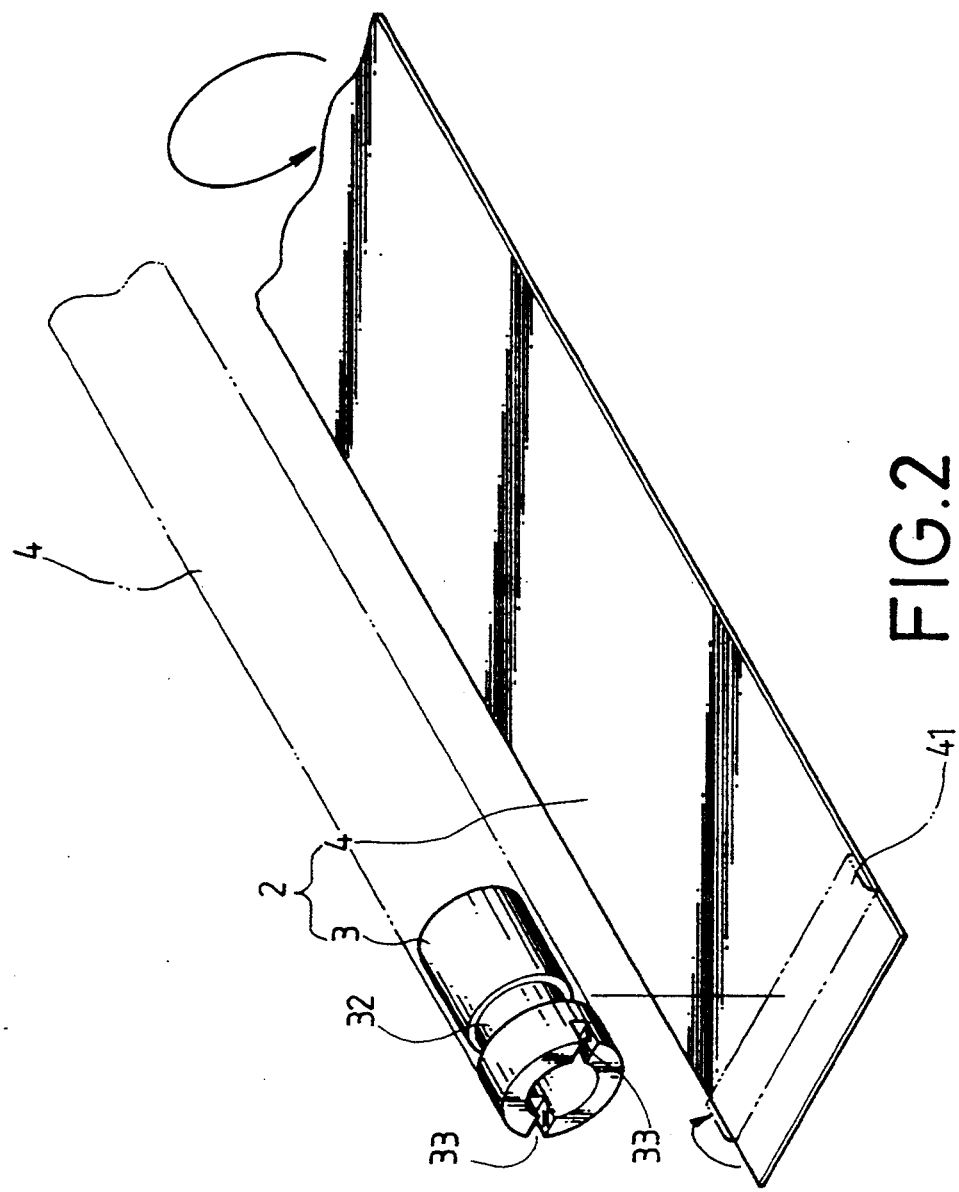
FIG. 2 illustrates the procedure in making a frame tube according to the present invention.

Turning now to the annexed drawings in detail, a bicycle frame in accordance with the preferred embodiment of the present invention is generally comprised of two-way and four-way connectors 1, i.e., connectors for attaching two or four tubes and frame tubes 2. The connectors 1 are respectively made from a suitable metal, each having at least one socket with a male thread (or female thread) 11. Each Frame tube 2 is comprised of a carbon fiber tube 4, and two metal connecting members 3 fastened to the carbon fiber tube 4 at its two opposite ends. Each metal connecting member 3 comprises a female thread (or male thread) 31 for fastening to the respective male thread (or female thread) 11 on the respective connector 1, an annular groove 32 around the outside wall, and end notches 33 for fastening the respective connector 1 by a water surface welding process. Radial screw holes may be made on the metal connecting member 3 to replace the end notches 33 for fastening the respective connector 1 by screws. The carbon fiber tube 4 is made from a carbon fiber cloth through a heating process. Before shape forming, the carbon fiber cloth is folded up to form two flanges 41 respectively disposed near two opposite ends thereof. During the process of shape forming, the carbon fiber cloth is covered around the two metal connecting members 3 with the flanges 41 respectively engaged around the annular groove 32 on each metal connecting member 3 (see FIG. 2).

Figure 3:
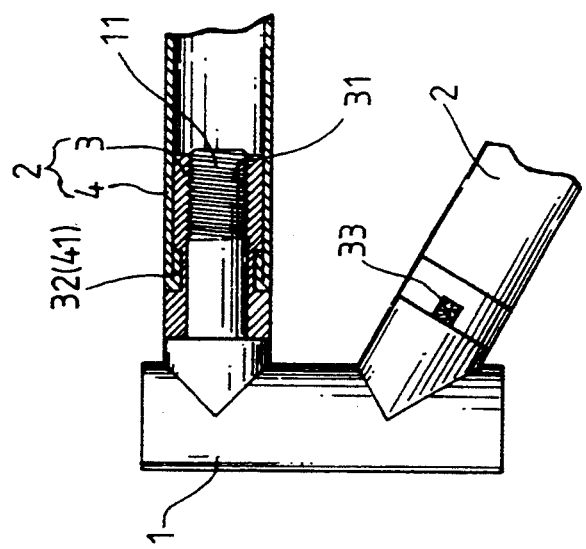
FIG. 3 illustrates two frame tubes fastened to a connector according to the present invention.
Figure 4:
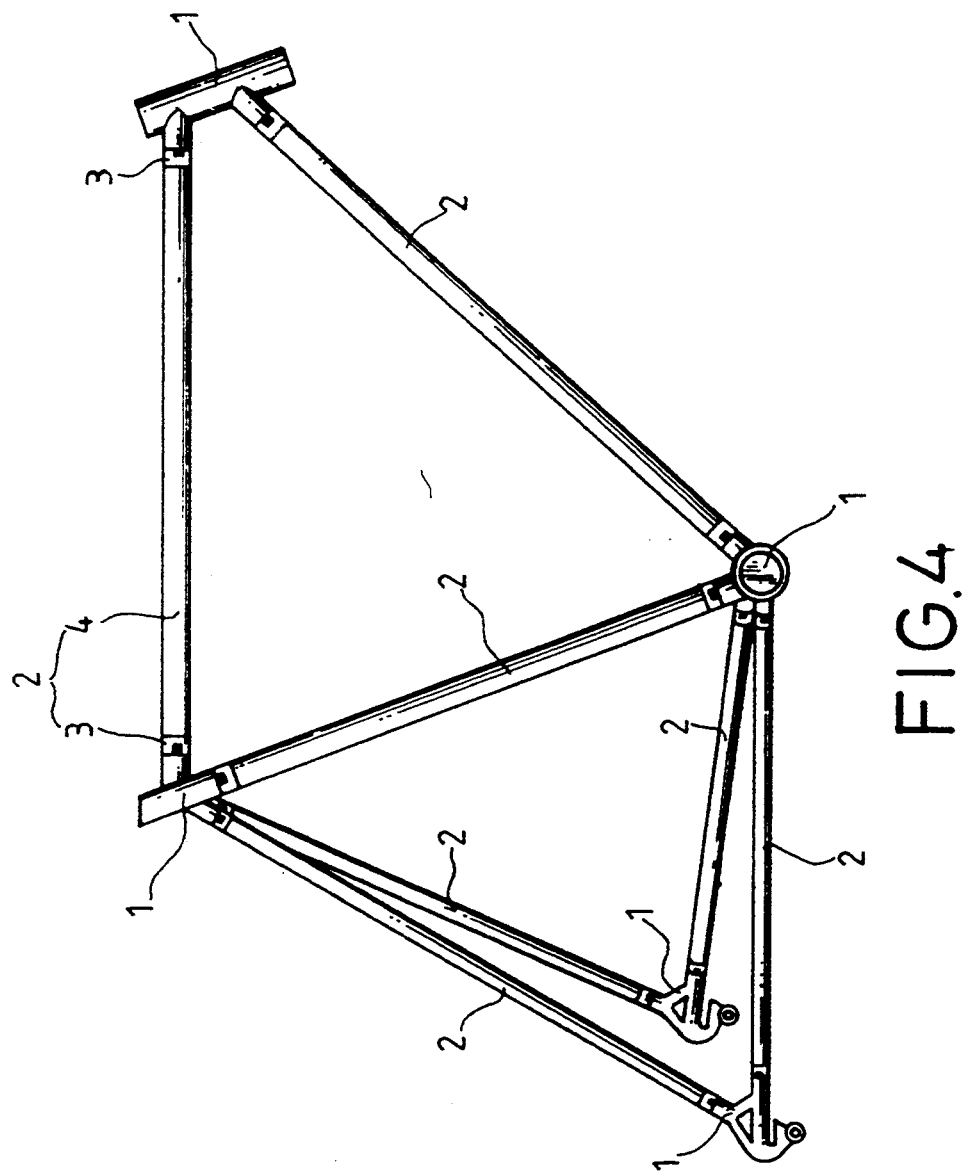
FIG. 4 is an elevational view of a bicycle frame according to the present invention.

Referring to FIGS. 3 and 4, by engaging the thread 31 on each metal connecting member 3 with the respective thread 11 on the respective connector 1, the frame tubes 2 are connected by the connectors i and formed into a bicycle frame. When assembled, a water surface welding process is employed to the end notches 33 to weld each metal connecting member 3 to the respective connector 1. This fastening procedure is much more simple than the conventional weld-all-over welding procedure, and therefore the manufacturing cost of the bicycle frame is greatly reduced. When finished, the bicycle frame causes a sense of beauty.

Referring to FIG. 4 again, each frame tube 2 has two metal connecting members 3 at two opposite ends respectively fastened to a respective connector 1 by a respective screw joint, and each connector 1 is connected to at least two frame tubes 2. Therefore, the turning direction of the thread 31 on one metal connecting member 3 of each frame tube 2 is reversed to that of the thread 31 on the other metal connecting member 3 of the same frame tube 2, i.e. one metal connecting member 3 of each frame tube 2 has a left-handed thread while the other metal connecting member 3 of the same frame tube 2 has a right-handed thread. As each metal connecting member 3 is fastened to the respective connector 1 by a screw joint and then reinforced by a water surface welding process, the structure of the bicycle frame is very strong, and the parts of the bicycle frame do not disconnect from one another even if the bicycle frame is heavily shaken.

As indicated, the present invention provides a bicycle frame made of carbon fiber tubes and metal connectors, having numerous advantages including lightweight, low cost, and a nice look.

While only one embodiment of the present invention has been shown and described, it will be understood that various modifications and changes could be made without departing from the spirit and scope of the invention.

What is claimed is:

1. A bicycle frame comprising a plurality of frame tubes interconnected together by metal connectors at opposite ends of the tubes, each connector including at least two threaded sockets and each frame tube comprising a carbon fiber tube with a threaded metal connecting member at each end of the carbon fiber tube, the connector members being threaded onto respective ones of the threaded sockets, wherein each metal connecting member is engaged with one of the carbon fiber tubes by means of an annular groove in the connecting member and an interfitting annular flange on the carbon fiber tube and wherein a respective end face of the carbon fiber tube abuts against a side of the groove.

2. A bicycle frame as claimed in claim 1 wherein each carbon fiber tube comprises a shaped carbon fiber sheet and the annular flange comprises an end fold formed in the sheet.

3. A bicycle frame as claimed in claim 1 wherein the threaded sockets have male threads and the connecting members have female threads.

4. A bicycle frame as claimed in claim 1 wherein each frame tube has a first connecting member at one end provided with a lefthand thread and a second connecting member at an opposite end provided with a righthand thread.

5. A bicycle frame as claimed in claim 1 wherein each metal connecting member has end notches for water surface welding of the connecting member to a respective connector.

* * * * *